United States Patent [19]

Ballos, III

[11] Patent Number: 6,152,293

[45] Date of Patent: Nov. 28, 2000

[54] CONVEYOR SYSTEM FOR OVERCOMING THE ELASTIC SPRINGBACK IN THE FLAPS OF AN EMPTY BOX

[76] Inventor: Pete Ballos, III, 161 Harter Ave., NW., Canton, Ohio 44708

[21] Appl. No.: 09/270,394

[22] Filed: Mar. 16, 1999

Related U.S. Application Data

[63] Continuation-in-part of application No. 09/183,314, Oct. 30, 1998.

[51] Int. Cl.[7] .................................................. B65G 21/20
[52] U.S. Cl. ..................................... 198/836.3; 198/836.1
[58] Field of Search .............................. 198/836.1, 836.3, 198/861.1, 626.4, 604, 608

[56] References Cited

U.S. PATENT DOCUMENTS

| | | | |
|---|---|---|---|
| 3,776,350 | 12/1973 | Tice ....................................... | 198/836.3 |
| 4,064,987 | 12/1977 | Rowan ..................................... | 198/604 |
| 5,314,057 | 5/1994 | Calvert et al. ......................... | 198/483.1 |
| 5,492,218 | 2/1996 | Falkowski ............................. | 198/836.3 |
| 5,551,555 | 9/1996 | Gladieux et al. ..................... | 198/836.3 |
| 5,735,378 | 4/1998 | Sundquist ............................... | 193/356 |
| 5,947,258 | 9/1999 | Yap et al. ......................... | 198/836.3 X |

*Primary Examiner*—James R. Bidwell
*Attorney, Agent, or Firm*—Sand & Sebolt

[57] ABSTRACT

A conveyor system for retaining a box thereon includes a conveyor assembly slidably adjustable on a frame. The conveyor assembly includes a first set of rollers rotationally mounted on a support rail attached to the conveyor assembly. A corresponding second set of rollers are rotationally mounted to another support rail parallel and spaced apart from the first support rail and fixedly attached to the frame. The rotational axis of each of the rollers is angled forward in the direction of operative travel of the conveyor belt and box. In operation, the angled rollers snugly engage the box and urge the box against the conveyor belt when the box is translated thereby. The distance between the two sets of rollers is adjusted by sliding adjustment of the conveyor assembly with respect to the frame, thus providing for expedited set up of the conveyor system to handle boxes of different widths. A second embodiment is presented wherein the first set of rollers is connected to at least one spring cylinder that biases the first set of rollers toward the second set of rollers.

20 Claims, 10 Drawing Sheets

CONVEYOR SYSTEM FOR OVERCOMING THE ELASTIC SPRINGBACK IN THE FLAPS OF AN EMPTY BOX

CROSS REFERENCE TO RELATED APPLICATION

The present application is a continuation-in-part application of U.S. application Ser. No. 09/183,314, filed Oct. 30, 1998, now pending, the disclosures of which are incorporated herein by reference.

BACKGROUND OF THE INVENTION

1. Technical Field

The invention relates generally to conveyor systems and, more particularly, to a conveyor system utilizing angled rollers for retaining an empty box on a conveyor belt as the box is transported along the conveyor belt. Specifically, the invention relates to a conveyor system that automatically adjusts to accommodate unassembled boxes having variations in size and delivers the boxes along a common index line and that utilizes angled rollers for retaining the boxes on the conveyor belt.

2. Background Information

Essentially all commercial goods travel through commerce enclosed in some type of packaging. Among the most common types of packaging are boxes (also referred to as cartons or cases) of a rectangular solid shape and that are typically manufactured of corrugated cardboard. Such boxes are of innumerable shapes and sizes suited to the specific needs of the packaging application. One such type of carton is a parallelepiped box with inward-turned flaps on at least the bottom thereof.

Unassembled parallelepiped boxes are typically cut from a single sheet of material and then formed into a generally tubular configuration having four sides. Each side terminates with a top flap and a bottom flap at opposite ends thereof. The top flaps and bottom flaps are folded inwardly and sealed to form top and bottom sides, respectively. Such boxes are typically shipped from a manufacturer in a flat configuration as blanks that must be assembled into a three-dimensional box prior to use. Such assembly can be by hand or through the use of a box erecting machine.

The flaps of a box are designated in the art as "major" and "minor" depending on their relative length. For instance, in a parallelepiped box having a length, a width, and a height, with the length and width being unequal, the major flaps are the two opposed flaps lying adjacent the longer of the length and width, with the minor flaps being the flaps adjacent the shorter of the length and the width. While many parallelepiped boxes have bottom-forming flaps and top-forming flaps, some parallelepiped boxes have only bottom-forming flaps, with the fully assembled box having an open top.

Parallelepiped boxes are assembled by first drawing the unassembled, flat box into a generally tubular rectangular shape. The minor flaps are each folded 90 degrees inward, with the major flaps then being folded 90 degrees inward and over the minor flaps. The flaps may then be sealed in place using glue, adhesive tape, gummed tape, or other such materials that are known and understood in the relevant art. In some situations, the bottom flaps are not sealed until after the box has been filled.

The bottom flaps of a parallelepiped box often are folded first with the top flaps being left open or unassembled so that the box can be filled with the appropriate contents. The box filling operation typically occurs on an open conveyor system. Such an open conveyor system typically includes a conveyor belt on which the boxes travel and sets of rollers on either side of the boxes parallel with the direction of belt travel to maintain boxes in the proper orientation as they travel down the conveyor belt for filling.

After a box has been filled, the final step is to fold and seal the top flaps of the box. The top flaps are assembled in a manner similar to the assembly of the bottom flaps, i.e., folding the minor flaps 90 degrees inward, folding the major flaps 90 degrees inward and over the minor flaps, and then sealing the major flaps in position with glue, adhesive tape, gummed tape, or the like. If the bottom flaps have not yet been sealed, they will typically be sealed at this point.

Such operations often are performed as part of an assembly line operation with the unfolded boxes being loaded into a magazine, each box being opened in turn and the bottom flaps thereof assembled to form a bottom. The boxes are then appropriately filled and the flaps thereof assembled.

When adhesive tape is utilized to seal the flaps of the box, the tape is typically delivered from a large roll attached to a tape head of the type known and understood in the relevant art. As indicated hereinbefore, the bottom flaps of a box may be folded prior to being filled and left unsealed until after the box has been filled and the top flaps have been folded into place. In such assembly lines, the bottom flaps and the top flaps of the boxes are typically sealed simultaneously by taping or gluing structures located both above and below the box assembly line.

One reason, among others, for performing the taping or gluing operations simultaneously on both the top and bottom flaps of a box is to facilitate replacement of tape rolls, refilling of glue reservoirs, etc., from a single location. Inasmuch as the boxes must typically be removed from the assembly line prior to replacing a tape roll, the removal of boxes from only one portion of the line while replacing the tape rolls on both the upper and lower taping mechanisms results in significant savings in cost and time. If the taping mechanisms for taping the top flaps and the bottom flaps are located at different points along the production line, boxes must be removed from both regions of the line to replace the tape rolls at those locations, thus requiring the expenditure of additional time and effort.

If the bottom flaps of a box are not sealed prior to being filled, the unsealed box typically must be held downward on the conveyor belt by a suitable structure, otherwise the combined elastic springback of the four bottom flaps will cause the box to rise up off the conveyor belt, often resulting in misalignments, jamming, and other conveyance problems. Such elastic springback is inherent in most materials, including those used to manufacture boxes. The elastic springback in the boxes is preferably overcome to assure continuous and reliable box conveyance and to prevent the interruptions and downtime to the production line resulting from boxes losing contact with the conveyer belt, becoming misaligned, and ultimately causing jams and other such problems. The unsealed boxed must be held against the conveyer belt prior to filling and must additionally be held subsequent to filling if the fill material is light or contains a great proportion of lightweight packing material that is of insufficient weight to overcome the aforementioned elastic springback.

One method known in the art of countering the elastic springback inherent in the folded but unsealed bottom flaps of a carton is to employ forward-angled rollers on either side of the boxes as they travel down the conveyor belt. The forward-angled rollers have the tendency to drive the box in a downward direction toward the conveyor belt as the box moves forward, thus retaining the box on the conveyor belt. Such forward-angled rollers have been used in other box-moving conveyor systems wherein it is desired to retain a box on a conveyor belt.

Box erecting machines and box conveyors of the type described above are rather complex and expensive machines that are permanently installed in production lines and are capable of being set up to assemble and transport boxes of different sizes. Such machines typically include adjustable guide rails that have rollers to maintain the boxes in proper orientation.

One such machine utilizes both a stationary guide and an adjustable guide that is adjusted to correspond with the width of the box being transported. One reason for designing machinery to contain a fixed guide and a moveable guide is to permit the boxes, as they are assembled and filled, to travel along a fixed, constant "index" line. Inasmuch as the cartons are assembled for the purpose of carrying goods, the goods must, at some point, be loaded into the boxes. Boxes traveling through a production line along a fixed index line are more easily filled than boxes that are delivered centered along a conveyor system inasmuch as centered boxes require a longer reach by the individual or the machinery that fills the box. Boxes traveling along a common index line can be filled directly from the index line with minimal reach and minimal wasted effort. Additionally, the use of a common index line for the filling of boxes expedites the setup of automated machinery used for filling such boxes. Such machinery has not, however, utilized forward-angled rollers to retain a box on a conveyor belt.

Another problem associated with erecting boxes in box erecting machines is that the standard tolerances of the box industry allow for varying dimensions such that each box has slightly varying width, length, and height dimensions. Although these varying dimensions do not create problems when the box is erected by hand, the varying dimensions can cause a box erecting machine to jam. In some boxes the dimensions may vary as much as ⅛ of an inch above or below the target dimension for a total of ¼ of an inch of uncertainty in the dimension. If the rollers are adjusted to the nominal dimension, boxes smaller than the nominal dimension may not be held by the rollers, and boxes larger than the nominal dimension might jam between the rollers if the rollers are fixed and are unable to adjust automatically to accommodate the different sized boxes.

The invention disclosed in U.S. Pat. No. 5,735,378 to Sundquist discloses a conveyor system utilizing forward-angled rollers to hold a carton downward on a conveyor system as the carton is transported. While the invention disclosed in Sundquist has achieved success for the purposes disclosed therein, Sundquist does not disclose a carton conveyor system capable of delivering boxes of different sizes along a common index line and does not disclose a conveyor system that can automatically adjust to accommodate boxes having dimensional variations.

Thus, a need exists for a conveyor system that can retaining an empty box on a conveyor belt along a common index line, that can automatically adjust to accommodate the dimensional variations of boxes, and that can function cooperatively with other box erecting and box taping machines which utilize a common index line and which are known and understood in the relevant art.

SUMMARY OF THE INVENTION

In view of the foregoing, an objective of the present invention is to provide a conveyor system that can overcome the elastic springback inherent in the folded but unsealed bottom flaps of a box.

Another objective of the present invention is to provide a conveyor system that can retain an empty box on a conveyor belt.

Another objective of the present invention is to provide a conveyor system that utilizes forward-angled rollers to retain an empty box on a conveyor belt.

Another objective of the present invention is to provide a conveyor system that can deliver boxes of different sizes along a common index line.

Another objective of the present invention is to provide a conveyor system utilizing forward-angled rollers to retain a box on a conveyor belt and that is readily adjustable for use with boxes of different sizes.

Another objective of the present invention is to provide a conveyor system having a set of forward-angled rollers rotationally mounted on an adjustable support rail.

Another objective of the present invention is to provide a conveyor system that can transport folded but unsealed boxes.

Another objective of the present invention is to provide a conveyor system that can transport empty boxes and minimize the potential for jamming and other conveyance problems.

Another objective of the present invention is to provide a conveyor system that can cooperate functionally with box erecting and sealing machines known and understood in the relevant art.

Another objective of the present invention is to provide a conveyor system that can overcome the elastic springback inherent in folded but unsealed bottom flaps of boxes to reliably transport empty or lightly loaded boxes.

Another objective of the present invention is to provide a conveyor system having at least one spring-loaded rail that includes a plurality of forward-angled rollers.

Another objective of the present invention is to provide a conveyor system having two sets of forward-angled rollers that can automatically adjust to accommodate boxes having variations in size.

Another objective of the present invention is to provide a conveyor system that can be adjusted to a nominal position and additionally includes a self-adjusting mechanism that allows the conveyor system to accommodate boxes having dimensional variations.

Another objective of the present invention is to provide a conveyor system having a spring-loaded guide rail while delivering boxes along a common index line.

Another objective of the present invention is to provide a conveyor system that can transport boxes having nominal dimensional variations without the dimensional variations causing conveyance problems such as jamming and misalignment, as well as other conveyance problems.

A further objective of the present invention is to provide a conveyor system that facilitates proper adjustment of the conveyor system by automatically providing and taking up slack as needed.

These and other objectives and advantages of the invention are obtained from the conveyor system for retaining an empty box invention, the general nature of which can be stated as including a frame, a plurality of first angled rollers rotatably mounted on the frame, a conveyor assembly adjustably mounted on the frame, at least a first spring mounted on the conveyor assembly, a movable support rail adjustably mounted on the at least first spring, a plurality of second angled rollers rotatably mounted on the movable support rail, the second angled rollers biased by the spring toward the first angled rollers, and a conveyer belt disposed at least partially between the first angled rollers and the movable support rail.

Other objectives and advantages are obtained from the improvement of the present invention, the general nature of which can be stated as relating to a conveyor system of the type having a frame, a plurality of first angled rollers rotatably mounted on the frame, a movable support rail adjustably mounted on the frame, a plurality of said second angled rollers rotatably mounted on the movable support rail, and a conveyor belt disposed at least partially between the first angled rollers and the movable support rail, the improvement comprising at least a first spring adjustably mounted on the frame and the movable support rail mounted on the at least first spring.

Still other objectives and advantages are obtained from the conveyor system of the present invention, the general nature of which can be stated as including a frame, a plurality of first angled rollers rotatably mounted on the frame, a conveyor assembly adjustably mounted on the frame, a movable support rail mounted on the conveyor assembly, a plurality of second angled rollers rotatably mounted on the movable support rail, a first conveyor belt disposed at least partially between the first angled rollers and the movable support rail, and biasing means for biasing the movable support rail toward the first angled rollers such that the movable support rail automatically adjusts to accommodate the box on the conveyor belt and the first and second angled rollers maintain a retention force on the box.

BRIEF DESCRIPTION OF THE DRAWINGS

The preferred embodiments of the invention, illustrative of the best modes in which Applicant has contemplated applying the principles of the invention, are set forth in the following description and are shown in the drawings and are particularly and distinctly pointed out and set forth in the appended claims.

Similar numerals refer to similar parts throughout the specification.

DESCRIPTION OF THE PREFERRED EMBODIMENTS

The conveyor system of the present invention is indicated generally by the numeral 2 in the accompanying drawings. Conveyor system 2 includes a frame 4 upon which is mounted a conveyor assembly 6. Conveyor assembly 6 includes a conveyor frame 8 about which is driven a conveyor belt 10. Conveyor belt 10 is a conventional conveyor belt known and understood in the relevant art. Conveyor belt 10 is driven by a drive motor 12 that is operatively connected with conveyor belt 10 by a belt 14. In the other embodiments of the present invention, conveyor assembly 6 may include a plurality of powered rollers instead in place of conveyor belt 10 or other similar conveying devices other than belt 10.

Figure 7:
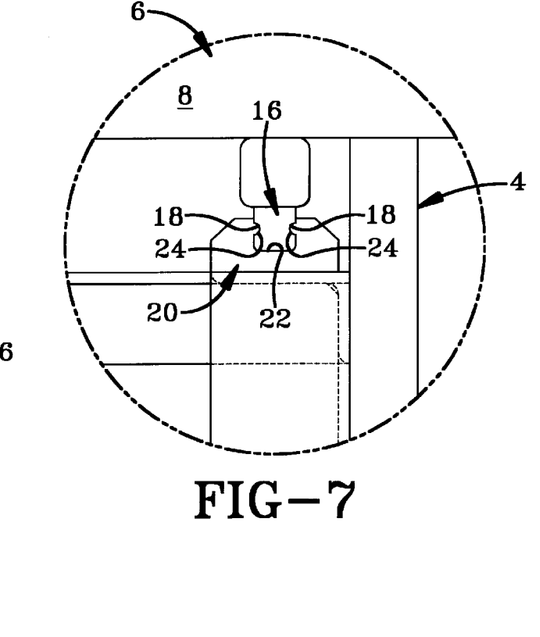
FIG. 7 is an enlarged view of the encircled portion of the conveyor system of the present invention shown in FIG. 2.
Figure 8:
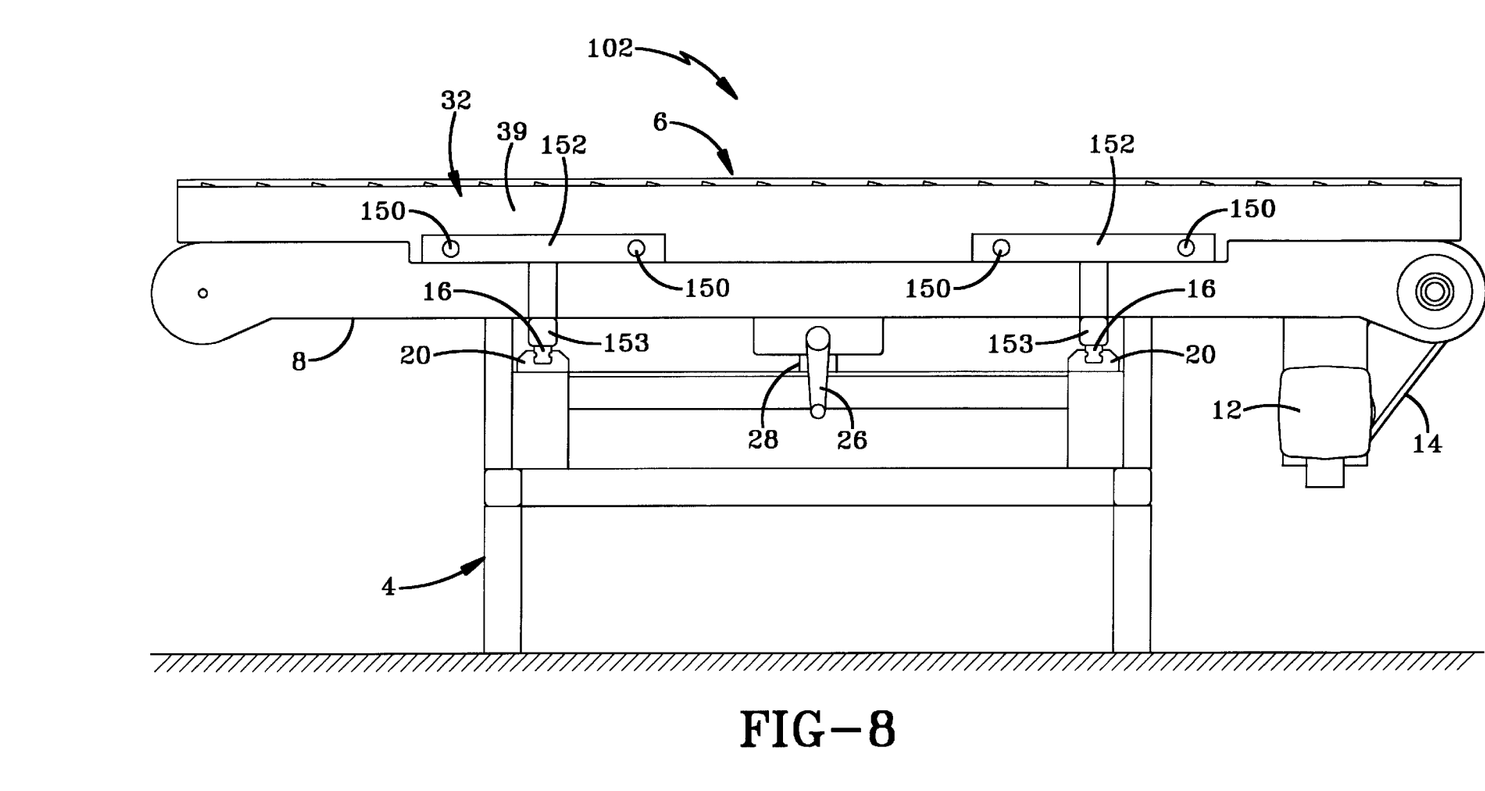
FIG. 8 is a front elevational view of a second embodiment of the conveyor system of the present invention.

Conveyor assembly 6 is slidably mounted on frame 4 by the sliding engagement of a pair of bars 16 attached to conveyor assembly 6 with a corresponding pair of saddles 20 attached to frame 4. Bars 16 are mounted transverse to the operative direction of movement of conveyer belt 10. As best shown in FIG. 7, each bar 16 is an elongated body containing a pair of indentations 18 on opposite sides of bar 16 and extending the length thereof. Each saddle 20 has a channel 22 of a cross section corresponding with that of bar 16. As can be seen in FIG. 7, each saddle 20 contains a pair of dimples 24 on opposite sides of channel 22 and extending the length thereof. The cross section of bar 16 corresponds with the cross section of channel 22, and dimples 24 correspond with indentations 18 such that bar 16 is slidably mounted within channel 22 of saddle 20. In accordance with the objectives of the invention, and as seen in FIG. 7, the cooperation of indentations 18 with dimples 24 permits bar 16 to slide within channel 22, yet prevents substantially any movement of bar 16 in a direction other than longitudinal with respect to the length of bar 16. In accordance with the features of the present invention, the interaction of indentations 18 with dimples 24 enhances the structural stability of conveyor system 2 by maintaining conveyor assembly 6 in a substantially stable, planar relationship with frame 4.

Figure 5:
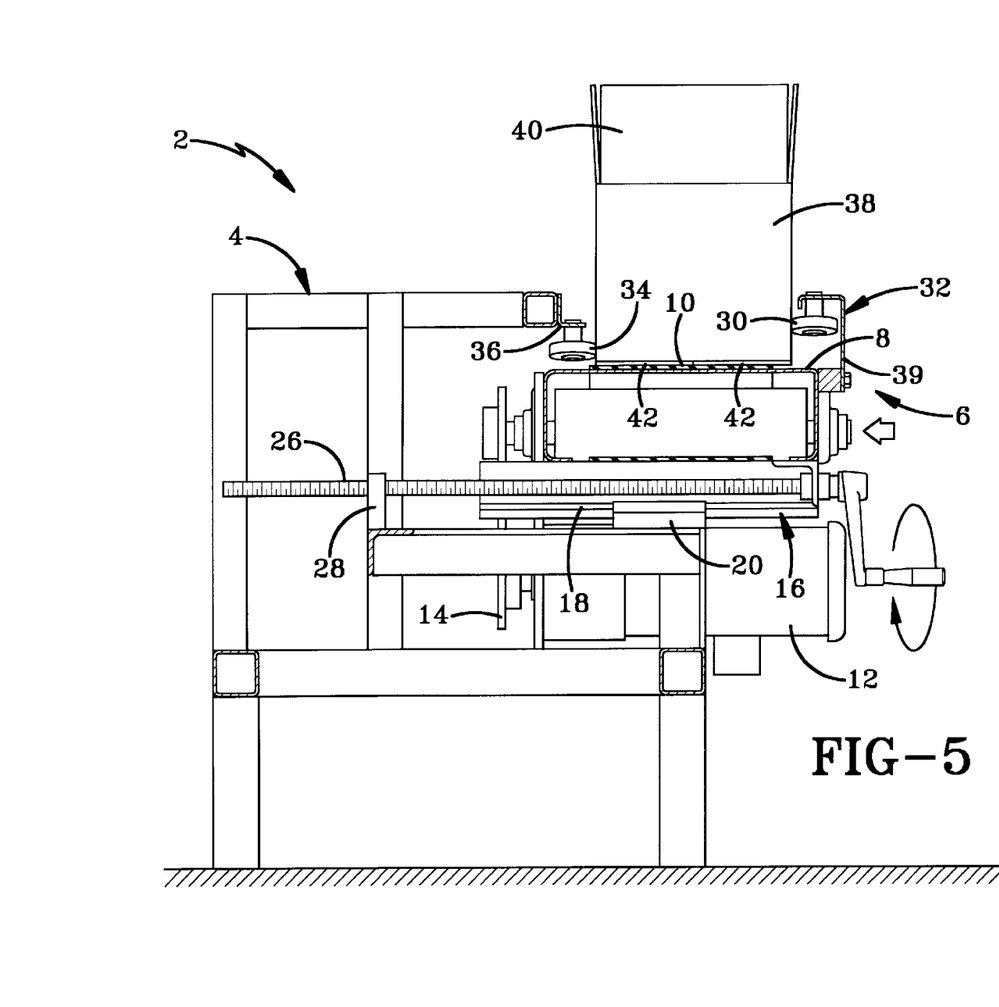
FIG. 5 is a left side elevational view partially in section of the conveyor system of the present invention used with a different box than in FIG. 4.

Conveyor assembly 6 is slidably adjusted with respect to frame 4 by operation of a threaded adjustment crank 26 rotationally mounted on conveyor assembly 6 and threadedly connected with a threaded block 28 attached to frame 4. In accordance with the objectives of the present invention, and as shown in FIG. 5, the selective rotation of adjustment crank 26, with the corresponding threaded interaction of adjustment crank 26 with block 28, causes conveyor assembly 6 to move slidably between inward and outward positions with respect to frame 4. In other embodiments of the present invention, threaded block 28 may be attached to conveyor assembly 6 with adjustment crank 26 rotationally mounted on frame 4.

In accordance with the objectives of the invention, a first set of rollers 30 is rotationally mounted to a movable support rail 32 fixedly attached to conveyor frame 8. A corresponding second set of rollers 34 is rotationally mounted to a fixed support rail 36 which is, in turn, fixedly attached to frame 4. An index line 44 is defined along a reference plane extending upwardly from the outermost edges of rollers 34 facing rollers 30. Rails 32 and 36 are preferably parallel and spaced apart.

Each roller 30 and 34 is of a type known and understood in the art for the purpose of engaging a cardboard box.

Rollers 30 and 34 are preferably of a durable rubber-type compound, although other materials and compounds may be used for the manufacture of rollers 30 and 34 without departing from the spirit of the present invention.

Figure 6:
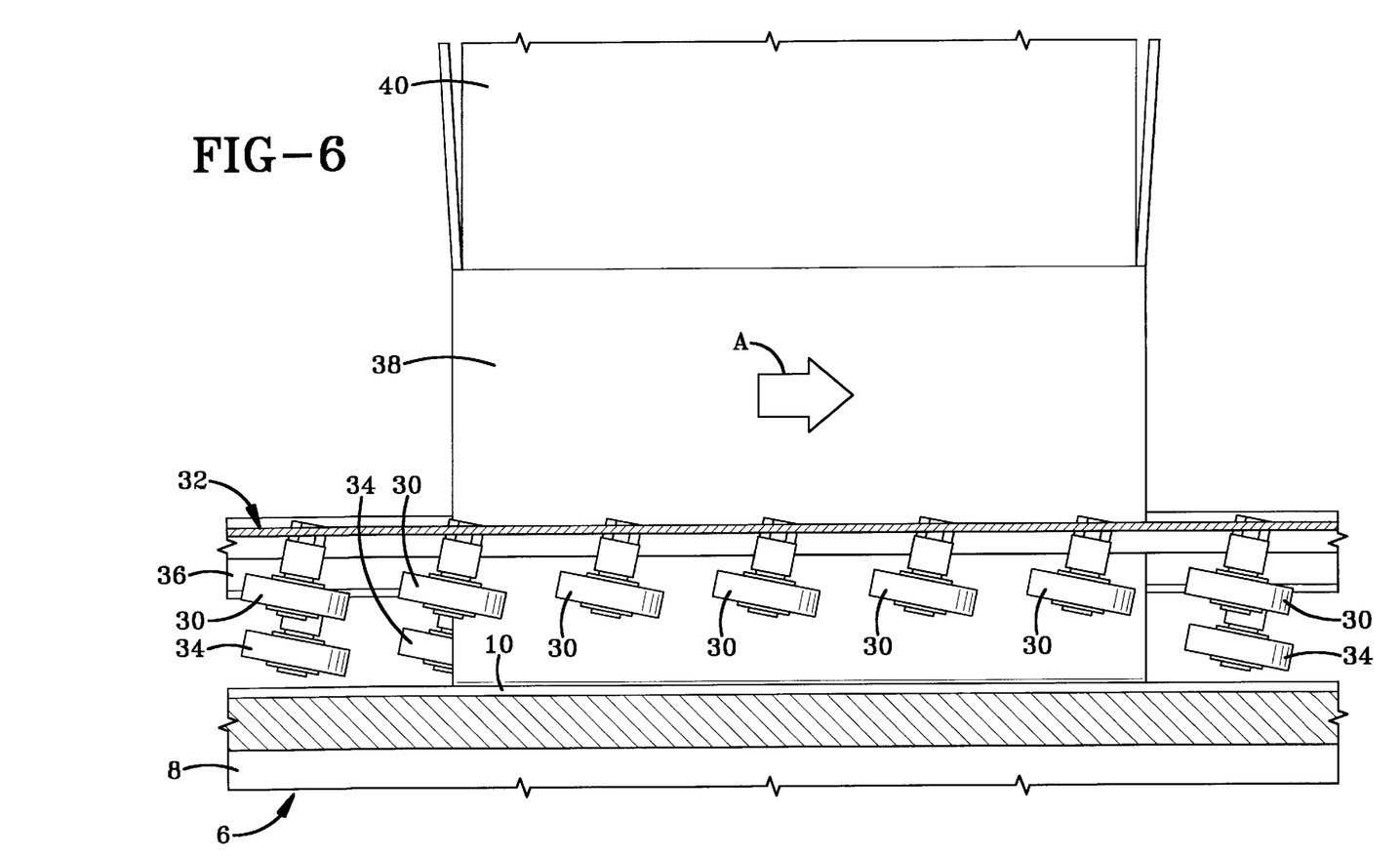
FIG. 6 is a sectional view of the conveyor system of the present invention as shown along line 6—6 of FIG. 4.

As can be seen in FIG. 6, rollers 30 and 34 are axially mounted to rails 32 and 36, respectively, and the axis of rotation of rollers 30 and 34 is angled from vertical. FIG. 6 depicts a box 38 and an arrow, indicated by the letter A, indicating the travel direction of box 38 as it is transported by conveyor belt 10. The rotational axis of each of rollers 30 and 34 is angled forward in the direction of arrow A at an angle in the range of approximately 10° to 30°, although angles greater and lesser may be used without departing from the spirit of the present invention. The rotational axis of each of rollers 30 and 34 is preferably the same such that each of rollers 30 and 34 rotate about axes that are parallel and spaced apart. The forward rotational alignment of rollers 30 and 34 causes box 38 to be driven against conveyor belt 10 as box 38 is translated by conveyor belt 10.

Figure 4:
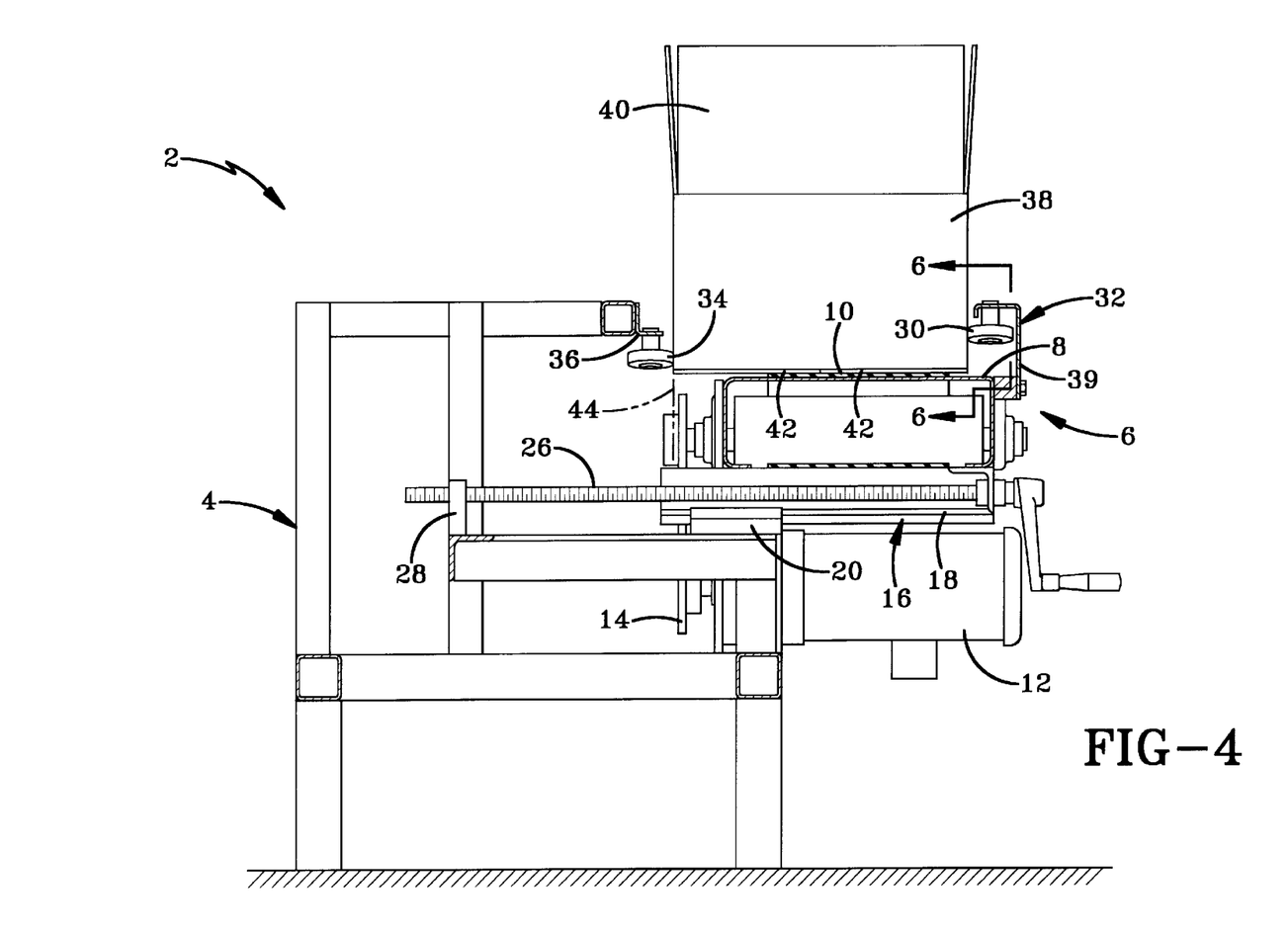
FIG. 4 is a left side elevational view, partially in section, of the conveyor system of the present invention used with a wide box.

In use, adjustment crank 26 is turned until box 38 fits snugly between rollers 30 and rollers 34. As is known and understood in the relevant art, rollers 30 and 34 have at least a nominal resilient character. Moreover, as can be seen in FIG. 4, movable support rail 32 includes a vertical member 39 between its point of attachment with conveyor frame 8 and the mount for each of rollers 30. Vertical member 39 may be configured or designed to possess its own resilient character. Fixed support rail 36 may also be configured to possess its own resilient character.

In accordance with the objectives of the present invention, with rollers 30 and 34 snugly contacting box 38, the forward motion of conveyor belt 10 in the direction of arrow A (FIG. 6) causes rollers 30 and 34 to rotate about their respective axes, thus driving box 38 against conveyor belt 10 in a manner known and understood in the relevant art. As such, rollers 30 and 34 have a sliding contact with box 38 and provide a constant downward force on box 38 against conveyor belt 10.

The retention of box 38 on conveyor belt 10 by rollers 30 and 34 provides a number of advantages. For example, as is shown in FIG. 4, box 38 contains a set of upper flaps 40 and a set of lower flaps 42. Upper flaps 40 are unfolded, and lower flaps 42 are shown to be folded but not sealed. In the absence of rollers 30 and 34, the elastic springback inherent in lower flaps 42 would likely cause empty box 38 to be pushed away from conveyer belt 10 and out of proper alignment between rails 32 and 36, thus resulting in jams and other conveyance problems. Rollers 30 and 34 thus overcome the problems known in the art associated with the elastic springback inherent in box flaps. Rollers 30 and 34 retain empty and lightly loaded boxes against conveyer belt 10 and overcome the elastic springback inherent therein. Even if lower flaps 42 of box 38 are sealed in place, rollers 30 and 34 still assist in retaining box 38 against conveyor belt 10, thus inhibiting jams and other such conveyance problems inherent in the conveyance of boxes.

As can be seen in FIG. 4, conveyor belt 10 is positioned substantially between rollers 30 and rollers 34, although conveyor belt 10 is not centered therebetween. Box 38, as shown in FIG. 4, extends a certain distance beyond the edge of conveyor belt 10 before it contacts rollers 34. Such overlap is irrelevant to the present invention inasmuch as rollers 30 and 34 urge box 38 against conveyor belt 10. Similarly, rollers 30 and rollers 34 are depicted in the accompanying drawings as being at different heights with regard to conveyor belt 10. Again, such height differential does not interfere with the proper functioning of the present invention, and rather enhances the versatility thereof by permitting conveyor system 2 to accommodate boxes of a wide variety of sizes.

In accordance with the objectives of the present invention, and as can be seen in FIG. 5, rollers 30 are each mounted to rail 32 which is, in turn, attached to conveyor assembly 6. Thus, adjustment of conveyor assembly 6 by rotation of adjustment crank 26 causes rollers 30 to simultaneously move inwardly and outwardly as desired. The simplified adjustment inward and outward of rollers 30 with respect to roller 34 permits conveyor system 2 to be quickly adjusted to accommodate boxes of different widths. The expedited setup of conveyor system 2 results in significant savings in cost and time beyond that provided by devices previously known and understood in the relevant art.

Figure 1:
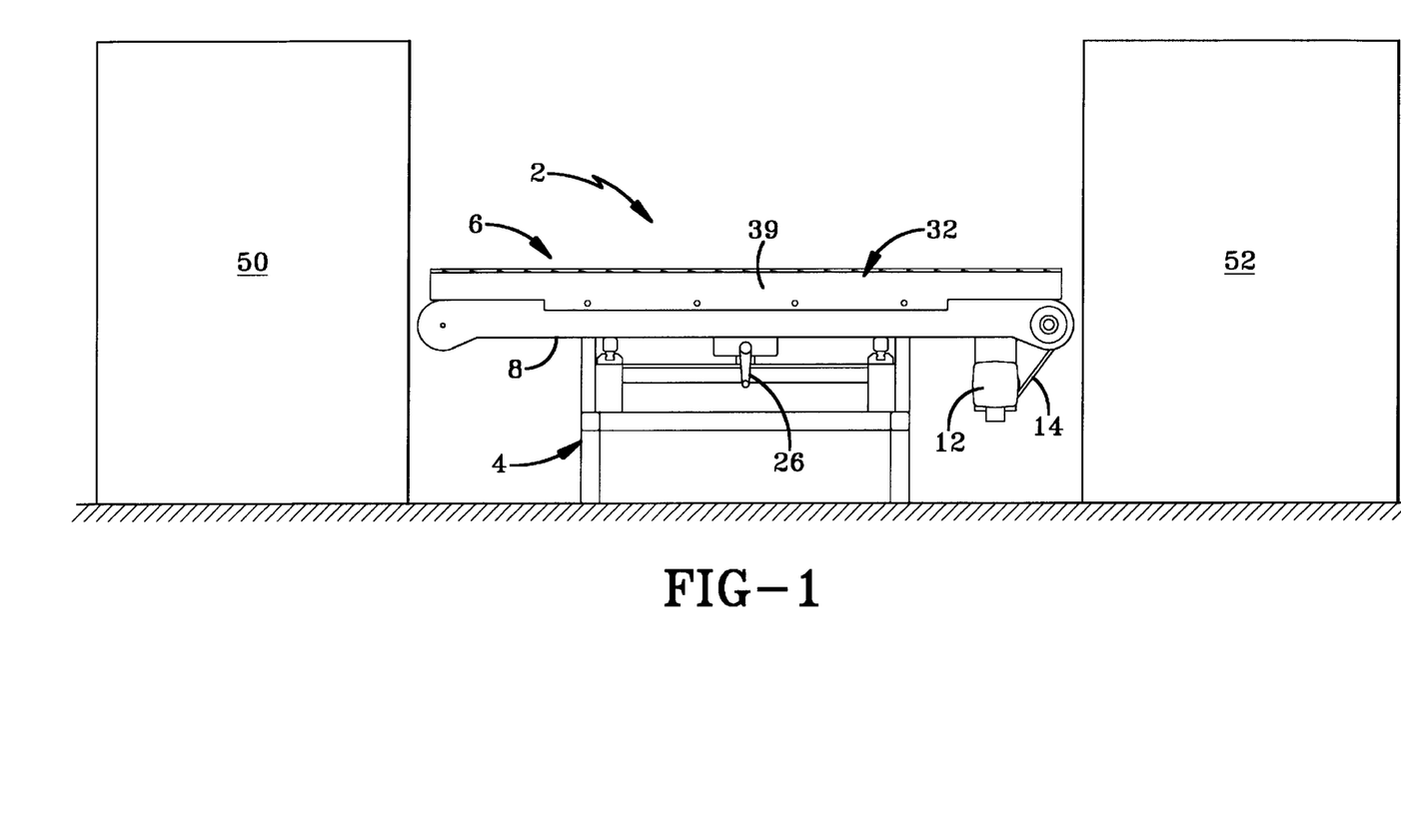
FIG. 1 is a front elevational view of the conveyor system of the present invention with its position shown relative to other machinery.
Figure 2:
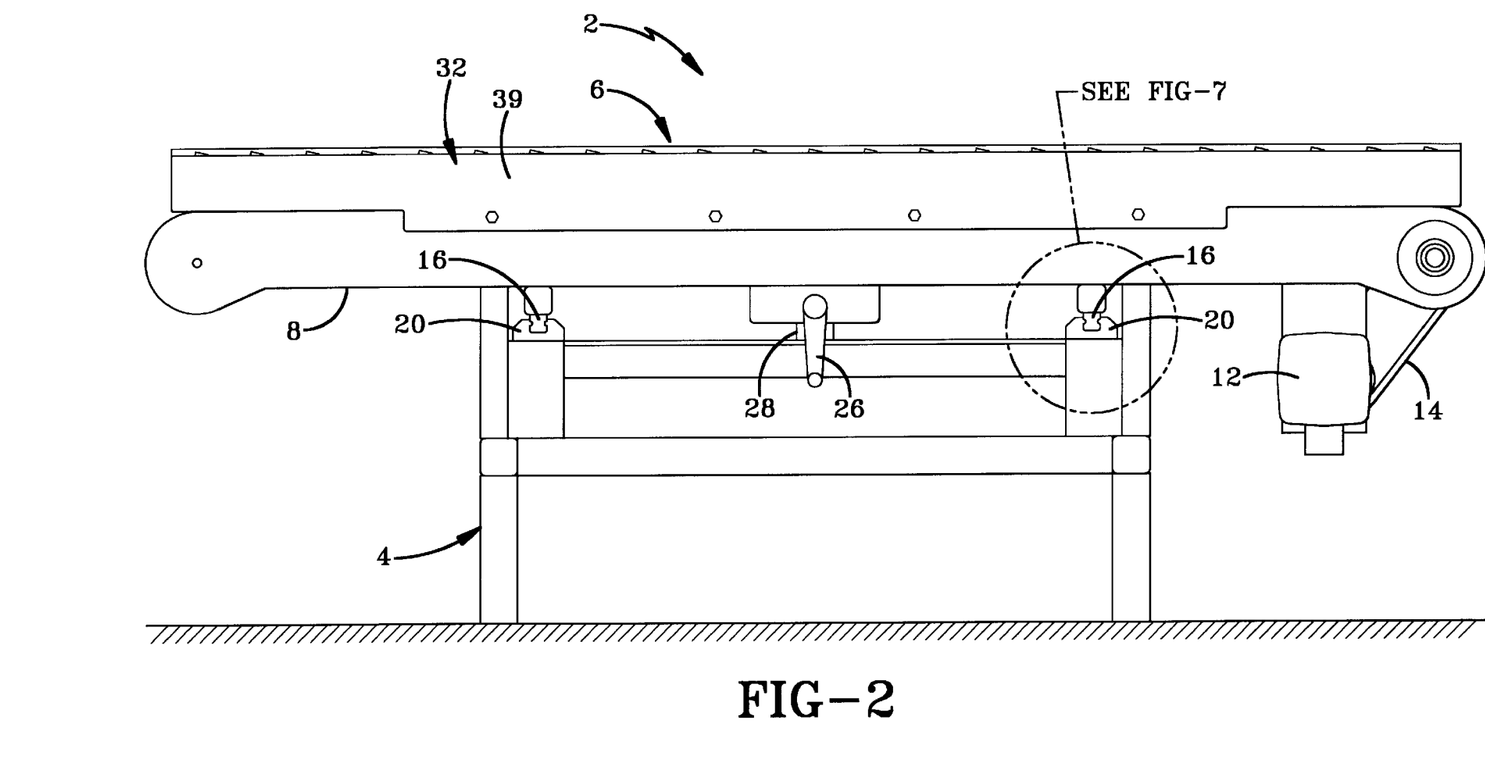
FIG. 2 is a front elevational view of the conveyor system of the present invention.
Figure 3:
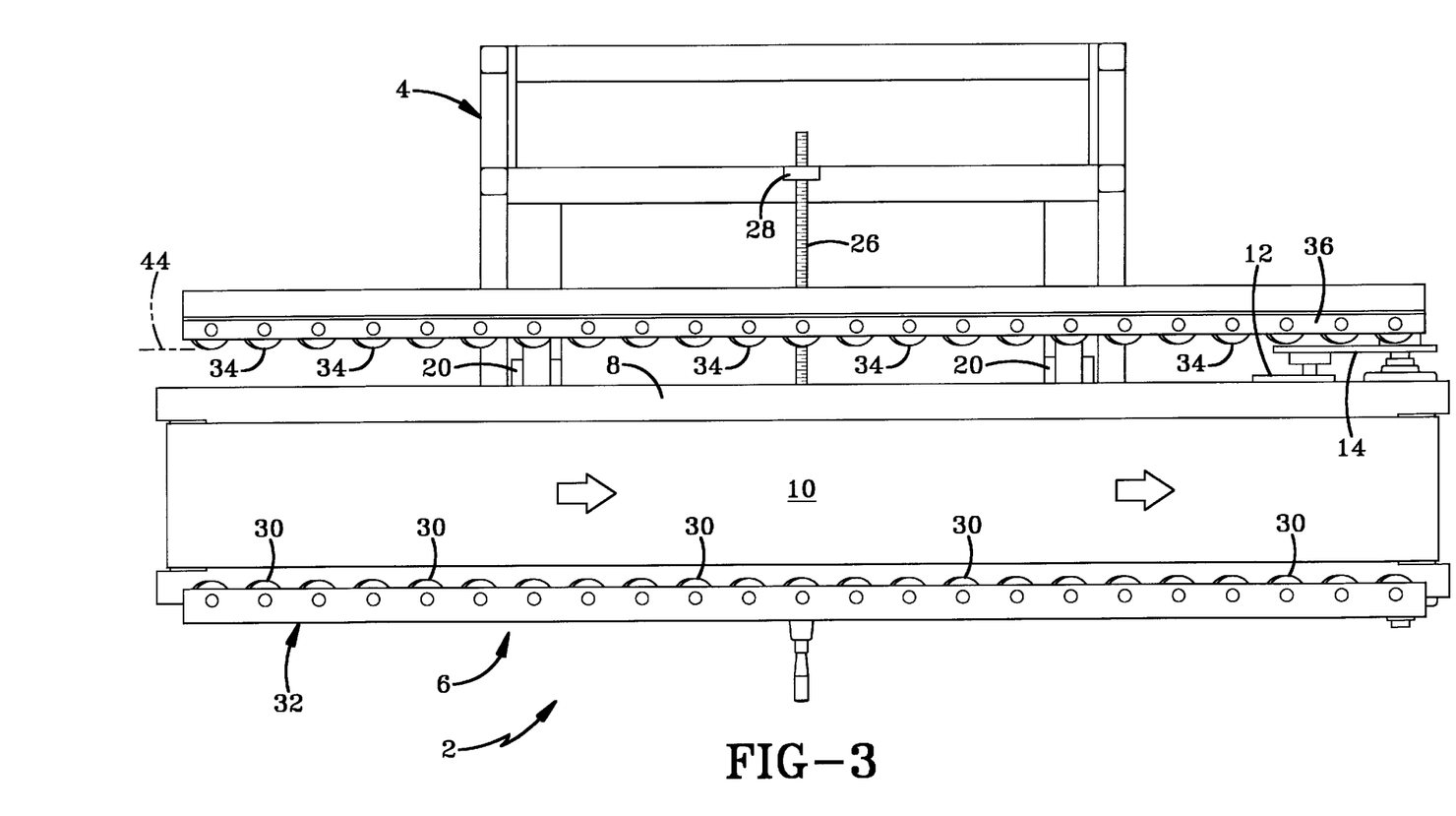
FIG. 3 is a plan view of the conveyor system of the present invention.

In accordance with the features of the invention, box 38 travels against index line 44 at it is moved by conveyer belt 10. As indicated hereinbefore, the use of an index line in a conveyer system is known in the packaging arts to provide significant benefits in time, effort, and cost. Index line 44 of conveyer system 2 can be aligned with the index lines of other devices known in the art such the box erecting machine 50 and the taping machine 52, depicted in FIG. 1, to create a common index line shared with all of the packaging machinery in a production line. Conveyer system 2 can work with other packaging machinery known in the art and can be easily incorporated into an assembly line therewith, thus providing substantial benefits to the user. The configuration depicted in FIG. 1 allows boxes to be erected from blanks in apparatus 50 and then ejected onto conveyor system 2 of the present invention where the boxes are loaded by workers or by automated machinery. Conveyor system 2 holds the empty boxes in the proper position until they are loaded and then maintains their proper alignment until they are fed into taping machine 52 where the bottom and top of each box is appropriately sealed. Each machine 50 and 52 typically has a fixed index line where all adjustments are taken from. The index line of conveyor system 2 allows it to be readily fit between machines 50 and 52 and adjusted in a similar manner.

A second embodiment of the conveyor system of the present invention is indicated generally by the numeral 102 in FIGS. 8–11. Conveyor system 102 is similar to conveyor system 2 except that support rail 32 of conveyor system 102 is not fixedly attached to conveyor frame 8 but rather has a spring-loaded attachment to conveyor assembly 6. Specifically, support rail 32 is fixedly attached to four spring cylinders 150 that are mounted on a pair of T-shaped posts 152. Posts 152 each protrude upwardly from and are fixedly attached to a member 153 that extends from conveyor assembly 6.

Figure 11:
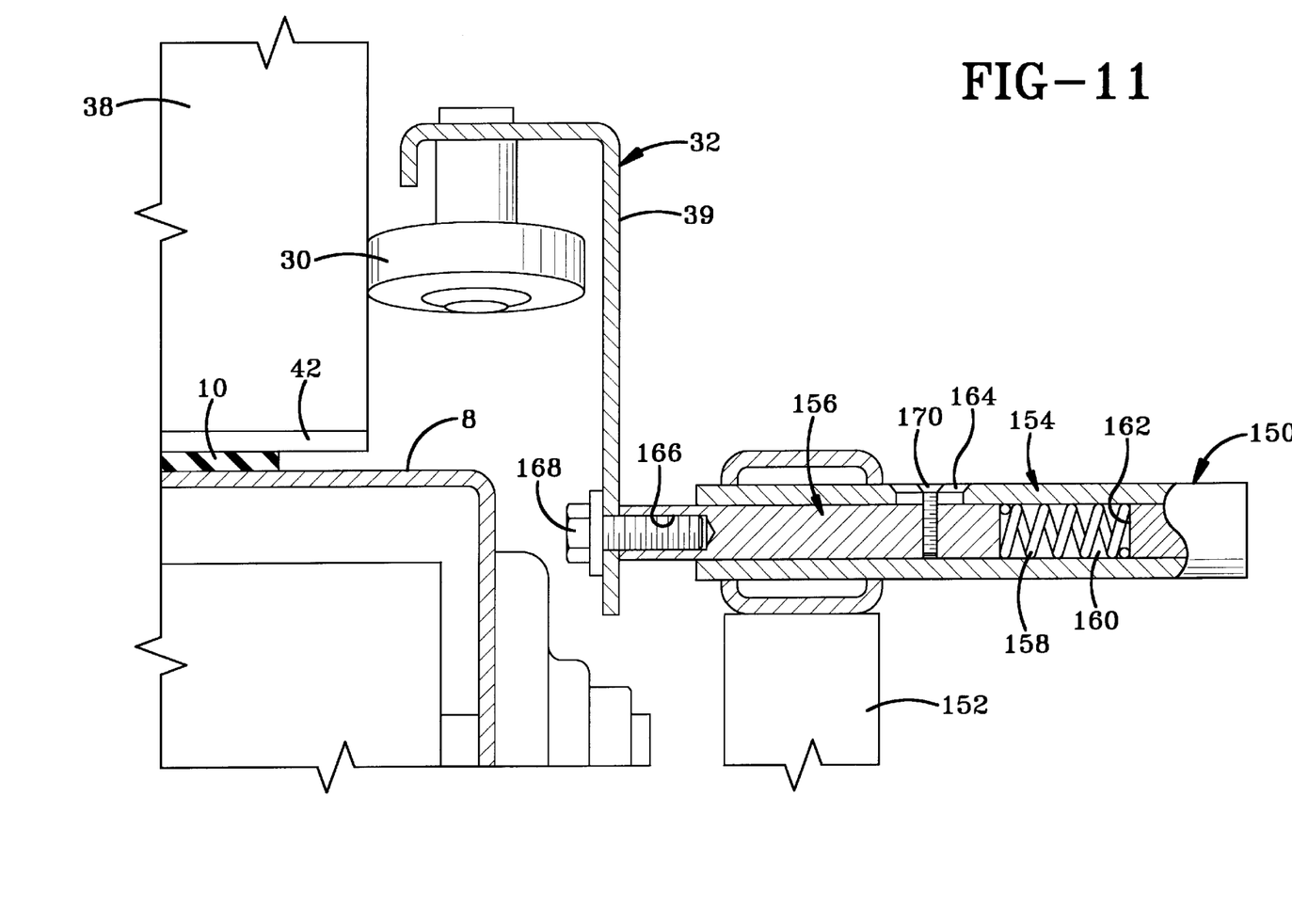
FIG. 11 is an enlarged sectional view of the spring cylinder of the second embodiment.

Each spring cylinder 150 includes a barrel 154, a plunger 156, and a spring 158. Barrel 154 is an elongated body formed with a substantially cylindrical cavity 160 that terminates internally at a substantially flat stop 162. Barrel 154 is additionally formed with a longitudinally oriented slot 164 extending between cavity 160 and the outer surface of barrel 154.

Plunger 156 is an elongated body of substantially circular cross section configured to be slidingly received within cavity 160 and long enough to allow an end thereof to protrude from barrel 154. The protruding end of plunger 156 is formed with a threaded hole 166 that threadably receives a bolt 168 therein. Bolt 168 threadably and fixedly attaches support rail 32 to plunger 156. Plunger 156 additionally includes a post 170 disposed therein across a diameter of plunger 156 and protruding therefrom. As is best shown in FIG. 11, the shaft of post 170 protrudes outwardly from plunger 156 and extends into slot 164.

Spring 158 is interposed between stop 162 and plunger 156 inside cavity 160. Spring 158 biases support rail 32 and rollers 30 against box 38 and maintains a retention force between rollers 30 and 34 and box 38. The retention force ensures that rollers 30 and 34 remain in contact with box 38 to hold box 38 downward against conveyor belt 10. Slot 164 frictionally engages post 170 and serves as a stop that limits the outward extension of plunger 156 when no box is present between rails 32 and 36. In the preferred embodiments, post 170 is a screw that is threaded into plunger 156, but may be essentially any other structure that protrudes outwardly from plunger 156 through slot 164 without departing from the spirit of the present invention. Inasmuch as spring cylinders 150 bias support rail 130 in the direction of rollers 30, it is understood that a variety of other biasing structures could be used in place of spring 152 or spring cylinder 150, such as leaf springs, resilient rubber members, gas filled cylinders, etc., without departing from the spirit of the present invention.

Figure 9:
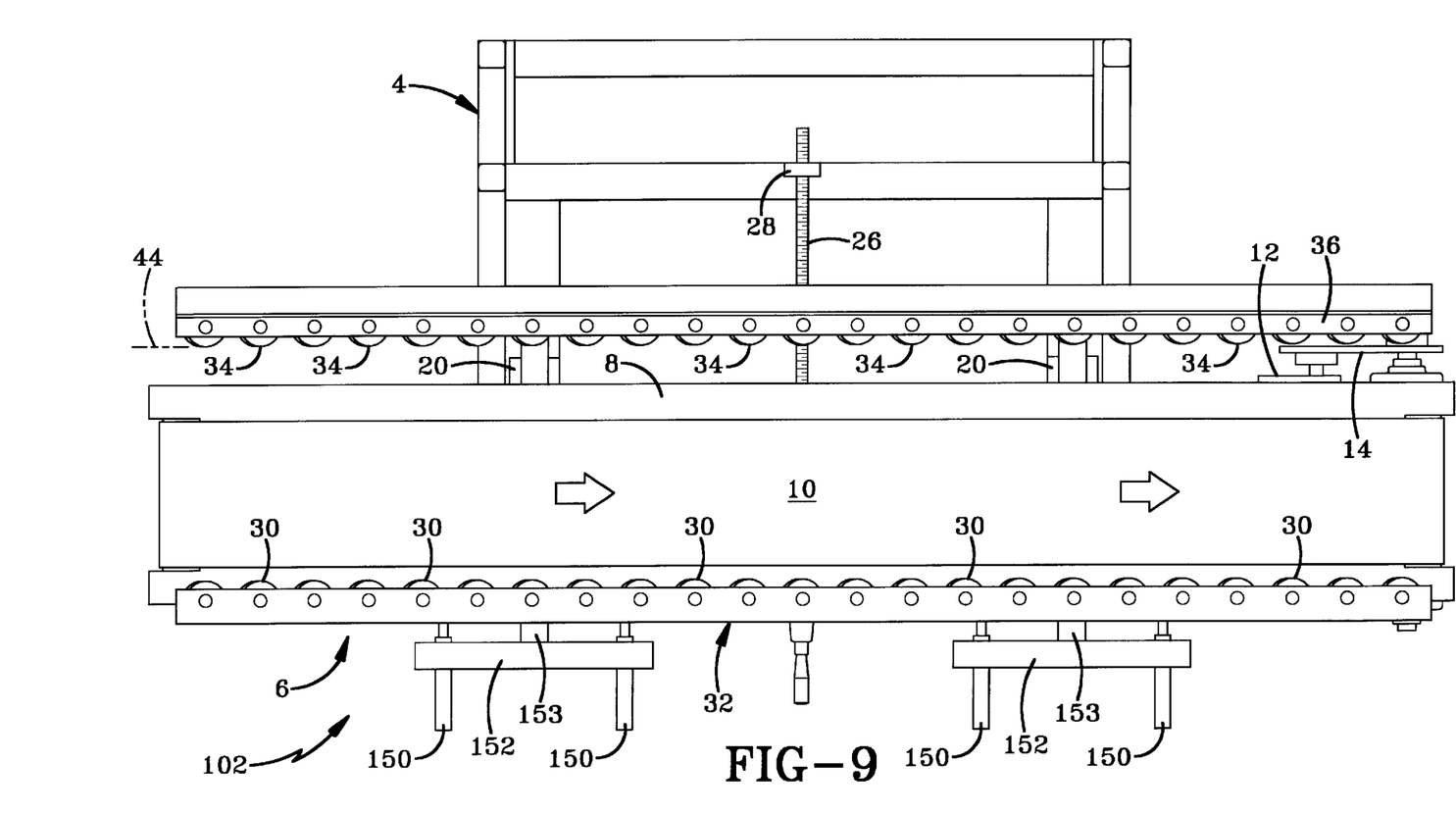
FIG. 9 is a top plan view of the second embodiment.
Figure 10:
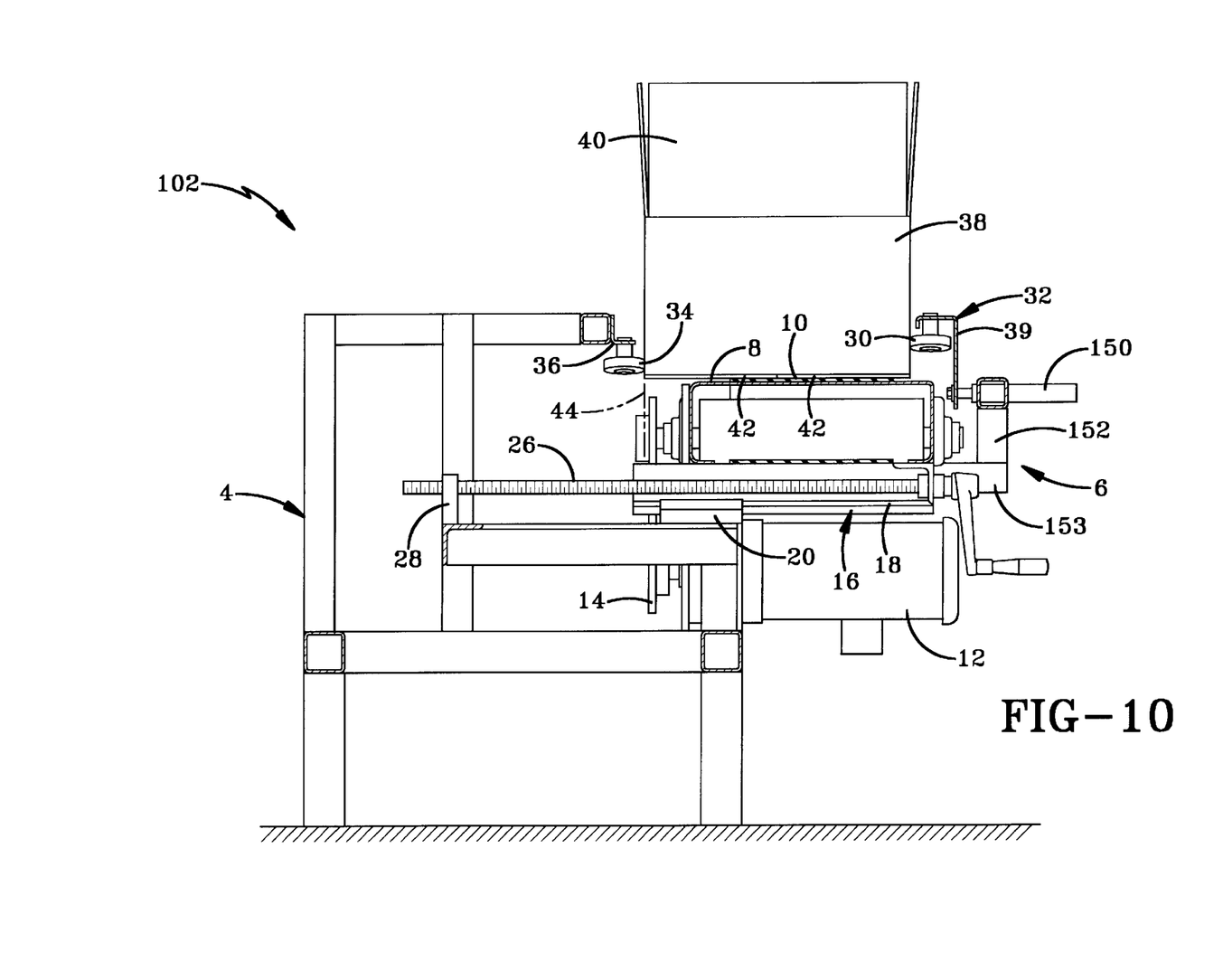
FIG. 10 is a left side elevational view partially in section of the second embodiment.

As is best shown in FIG. 9, each of posts 152 carries a pair of spring cylinders 150 to ensure that support rail 32 is supported sufficiently in the vertical direction. Barrels 154 are each fixedly attached to a post 152, with posts 152 each, in turn, mounted on one of members 153.

As is best shown in FIG. 11, plunger 156 is slidingly received in cavity 160 of barrel 154. In operation, adjustment crank 26 is adjusted until rollers 30 are at least nominally compressed against box 38. Inasmuch as spring cylinders 150 permit support rail 32 to move toward and away from rollers 30 in response to different sized boxes, it is preferred that adjustment crank 26 be adjusted until screws 170 are substantially centered within slots 164.

When an oversize box 38 is conveyed by conveyor system 2, plunger 156 will slidably extend farther into cavity 160, thus providing rollers 30 with sufficient slack to allow the oversize box 38 to pass between rollers 30 and 34 without jamming or other conveyance problems. Similarly, when an undersized box is transported between rollers 30 and 34, spring 158 biases plunger 156 outwardly from barrel 154, thus taking up the slack that would otherwise develop between the undersized box and rollers 30 and 34. In this regard, inasmuch as the variance in box sizes can be as large as one quarter inch, it is preferred that slot 164 be at least one quarter of an inch in length, and preferably be at least one half inch with spring 158, barrel 154, and plunger 156 configured accordingly. It is understood, however, that slots 164 can be of lengths shorter and longer without departing from the spirit of the present invention.

In accordance with the features of the present invention, the spring loading of support rail 32 permits conveyor system 102 to convey boxes 38 having nominal size differences without the differences in size creating conveyance problems such as jamming, misalignment, etc. Further in accordance with the objectives of the present invention, the inclusion of spring cylinder 150 permits the proper adjustment of conveyor assembly 6 to be less critical inasmuch as spring 158 permits support rail 32 to take up and provide slack as needed between rollers 30 and box 38.

Accordingly, the improved conveyor system for retaining an empty box invention is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness, and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the conveyor system for retaining an empty box invention is constructed and used, the characteristics of the construction, and the advantageous new and useful results obtained; the new and useful structures, devices, elements, arrangements, parts, and combinations are set forth in the appended claims.

I claim:

1. A conveyor system for transporting and retaining an empty box, said conveyor system comprising:

a frame;

a plurality of first angled rollers rotatably mounted on said frame;

a conveyor assembly mounted on said frame;

at least a first spring positioned adjacent the conveyor assembly;

a movable support rail mounted on said at least first spring;

said movable support rail being adjustable with respect to said first angled rollers;

a plurality of second angled rollers rotatably mounted on said movable support rail;

said second angled rollers biased by said at least first spring toward said first angled rollers; and a conveyer belt disposed at least partially between said first angled rollers and said movable support rail.

2. The conveyor system as set forth in claim 1 wherein said at least first spring is mounted on said conveyor assembly.

3. The conveyor system as set forth in claim 2 wherein said conveyor assembly is adjustably mounted on said frame.

4. The conveyor system as set forth in claim 1, further comprising a pair of posts, a second spring, a third spring, and a fourth spring, said first and second springs mounted on one of said posts, said third and fourth springs mounted on the other of said posts, said movable support rail mounted on said springs.

5. The conveyor system as set forth in claim 4 wherein said first and second posts are mounted on said conveyor assembly.

6. The conveyor system as set forth in claim 1 wherein each spring is disposed in a spring cylinder.

7. The conveyor system as set forth in claim 6 wherein said springs bias said second angled rollers toward said first angled rollers.

8. The conveyor system as set forth in claim 7 wherein said spring cylinders each further comprise a barrel formed with a cavity, said spring disposed in said cavity.

9. The conveyor system as set forth in claim 8 wherein each spring cylinder further comprises a plunger, said plunger slidingly received in said cavity.

10. The conveyor system as set forth in claim 9 wherein said movable support rail is mounted on said plungers.

11. The conveyor system as set forth in claim 10 wherein said springs bias said plungers toward said first angled rollers.

12. The conveyor system as set forth in claim 11 wherein said plungers each include a post protruding therefrom, said post retaining said plunger in said cavity.

13. The conveyor system as set forth in claim 12 wherein said posts limit the sliding travel of said plungers in said cavities.

14. The conveyor system as set forth in claim 13 wherein said barrels are each formed with a slot, said posts extending into said slots.

15. The conveyor system as set forth in claim 14 wherein said slots limit the sliding movement of said plungers within said cavities when said posts are biased by said springs into frictional engagement with said slots.

16. A conveyor system for transporting and retaining an empty box, said conveyor system comprising:

a frame;

a plurality of first angled rollers rotatably mounted on said frame;

a conveyor assembly adjustably mounted on said frame;

a movable support rail mounted on said conveyor assembly;

a plurality of second angled rollers rotatably mounted on said movable support rail;

a first conveyor belt disposed at least partially between said first angled rollers and said movable support rail; and biasing means for biasing said movable support rail toward said first angled rollers such that said movable support rail automatically adjusts to accommodate the box on said conveyor belt and said first and second angled rollers maintain a retention force on the box.

17. The conveyor system as set forth in claim 16 wherein said biasing means includes at least a first spring.

18. The conveyor system as set forth in claim 17 wherein said biasing means is disposed within a spring cylinder.

19. The conveyor system as set forth in claim 16 wherein said biasing means includes four springs, each of said springs disposed within a spring cylinder.

20. The conveyor system as set forth in claim 19, further comprising post means for limiting the sliding movement of said spring cylinders when said conveyor system is free of boxes.

* * * * *